United States Patent
Kolati et al.

(10) Patent No.: US 11,962,939 B1
(45) Date of Patent: Apr. 16, 2024

(54) METHOD OF MANAGING MEDIA COMMUNICATION IN MISSION CRITICAL (MC) SYSTEM, MC SERVER, AND RECEIVER THEREOF

(71) Applicant: Samsung Electronics Co., Ltd., Suwon-si (KR)

(72) Inventors: Naveen Kolati, Bangalore (IN); Kiran Gurudev Kapale, Bangalore (IN); Siva Prasad Gundur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/166,724

(22) Filed: Feb. 9, 2023

Related U.S. Application Data (63) Continuation of application No. PCT/KR2023/001795, filed on Feb. 8, 2023.

(30) Foreign Application Priority Data

| Feb. 9, 2022 | (IN) | ............................ 202241006882 |
| Jan. 9, 2023 | (IN) | ............................ 2022 41006882 |

(51) Int. Cl.
*H04N 7/14* (2006.01)
*H04L 51/224* (2022.01)
*H04L 65/65* (2022.01)

(52) U.S. Cl.
CPC ........... *H04N 7/147* (2013.01); *H04L 51/224* (2022.05); *H04L 65/65* (2022.05)

(58) Field of Classification Search
CPC ........ H04N 7/147; H04L 51/224; H04L 65/65
USPC ........................................................ 709/231
See application file for complete search history.

(56) References Cited

U.S. PATENT DOCUMENTS

| 9,866,802 | B2 * | 1/2018 | Carter ................. H04M 11/025 |
| 10,404,940 | B2 * | 9/2019 | Apelqvist .............. H04L 65/61 |
| 10,581,792 | B2 * | 3/2020 | Mostafa .................. H04L 51/58 |
| 10,599,280 | B2 * | 3/2020 | Caras .................... H04W 76/10 |
| 10,715,582 | B2 * | 7/2020 | Pattan ................... H04W 28/06 |
| 10,903,922 | B2 * | 1/2021 | Lee ........................ H04H 20/95 |

(Continued)

OTHER PUBLICATIONS

3GPP TS 22.281 V16.0.0 (Sep. 2018), Technical Specification, 3rd Generation Partnership Project; Technical Specification Group Services and System Aspects; Mission Critical Video services (Release 16), Sep. 2018, 31 pages.

(Continued)

*Primary Examiner* — Melvin H Pollack

(57) ABSTRACT

A method, a mission critical (MC) server, and a receiver for managing media communication in an MC system are provided. The method comprises receiving, from a sender, a request and a media stream for transmitting the media stream to one or more receivers. The request indicates a mode of transmission of the media stream. Further, the method comprises transmitting a notification message indicating a mode of reception identified based on the mode of transmission, to the one or more receivers for receiving the media stream from the sender. The mode of reception is one from among an emergency mode and a normal mode. Thereafter, the method comprises transmitting the media stream to the one or more receivers subsequent to transmission of the notification message, when the mode of reception is the emergency mode.

20 Claims, 10 Drawing Sheets

(56) References Cited

U.S. PATENT DOCUMENTS

| | | | | |
|---|---|---|---|---|
| 11,115,622 | B2* | 9/2021 | Kwak | H04L 67/02 |
| 11,199,837 | B2* | 12/2021 | Cella | G05B 19/4185 |
| 11,290,708 | B2* | 3/2022 | Haskin | H04N 17/004 |
| 11,452,032 | B2* | 9/2022 | Gupta | H04W 52/0261 |
| 11,546,396 | B1* | 1/2023 | Gundu | H04L 65/65 |
| 11,671,635 | B2* | 6/2023 | Kotaru | H04N 21/6106 |
| | | | | 709/231 |
| 11,706,802 | B2* | 7/2023 | Abotabl | H04W 72/23 |
| | | | | 370/329 |
| 11,729,440 | B2* | 8/2023 | Butler | H04N 21/234 |
| | | | | 709/224 |
| 11,729,761 | B2* | 8/2023 | Abedini | H04W 72/046 |
| | | | | 370/329 |
| 11,799,620 | B2* | 10/2023 | Horn | H04L 5/0007 |
| 11,832,268 | B2* | 11/2023 | Yang | H04W 72/23 |
| 11,832,283 | B2* | 11/2023 | Khoshnevisan | H04W 72/21 |
| 2016/0330601 | A1 | 11/2016 | Srivastava | |
| 2018/0160277 | A1 | 6/2018 | Patel et al. | |
| 2019/0230419 | A1 | 7/2019 | Yamagishi | |
| 2020/0099789 | A1 | 3/2020 | Miller et al. | |
| 2020/0287951 | A1 | 9/2020 | Kolati et al. | |
| 2020/0322967 | A1 | 10/2020 | Pattan et al. | |
| 2020/0329128 | A1* | 10/2020 | Singh | H04L 65/65 |
| 2020/0344577 | A1 | 10/2020 | Paterour et al. | |
| 2021/0144536 | A1 | 5/2021 | Wanstedt et al. | |
| 2021/0360302 | A1 | 11/2021 | Kolati et al. | |
| 2022/0286553 | A1* | 9/2022 | Anderson | A61B 5/7405 |
| 2023/0216947 | A1* | 7/2023 | Bernardi | H04L 63/10 |
| | | | | 713/150 |
| 2023/0217227 | A1* | 7/2023 | Maschue | H04W 28/0992 |
| | | | | 370/329 |
| 2023/0217403 | A1* | 7/2023 | Koskela | H04W 64/00 |
| | | | | 370/252 |
| 2023/0232394 | A1* | 7/2023 | Yuan | H04L 5/0044 |
| | | | | 370/329 |
| 2023/0328529 | A1* | 10/2023 | Wiacek | H04B 7/0626 |
| | | | | 726/23 |
| 2023/0345509 | A1* | 10/2023 | Kadiri | H04W 72/30 |

OTHER PUBLICATIONS

3GPP TS 22.281 V17.0.0 (Mar. 2022), Technical Specification, 3rd Generation Partnership Project; Technical Specification Group Services and System Aspects; Mission Critical Video services (Release 17), Mar. 2022, 31 pages.

3GPP TS 23.281 V18.1.0 (Jun. 2022), Technical Specification, 3rd Generation Partnership Project; Technical Specification Group Services and System Aspects; Functional architecture and information flows to support Mission Critical Video (MCVideo); Stage 2 (Release 18), Jun. 2022, 189 pages.

3GPP TS 24.581 V17.2.0 (Mar. 2022), Technical Specification, 3rd Generation Partnership Project; Technical Specification Group Core Network and Terminals; Mission Critical Video (MCVideo) media plane control; Protocol specification (Release 17), Mar. 2022, 226 pages.

International Search Report and Written Opinion of the International Searching Authority dated May 1, 2023, in connection with International Application No. PCT/KR2023/001795, 7 pages.

Huawei, "Co-existence of eMBMS and 5G MBS," S6-212658 (revision of S6-21xxxx), 3GPP TSG-SA WG6 Meeting #46, e-meeting, Nov. 15-23, 2021, 20 pages.

Office Action dated Dec. 11, 2023, in connection with Indian Patent Application No. 202241006882, 7 pages.

3GPP TS 24.581 v14.7.0 (Release 14); LTE; Mission Critical Video (MCVideo) media plane control; Protocol specification; ETSI TS 124 581 V14.7.0 (Oct. 2020); 185 pages.

* cited by examiner

METHOD OF MANAGING MEDIA COMMUNICATION IN MISSION CRITICAL (MC) SYSTEM, MC SERVER, AND RECEIVER THEREOF

CROSS-REFERENCE TO RELATED APPLICATIONS

This application is a bypass continuation of International Application No. PCT/KR2023/001795 designating the United States, filed on Feb. 8, 2023, in the Korean Intellectual Property Receiving Office and claiming priority to Indian Provisional Patent Application No. 202241006882 filed on Feb. 9, 2022, in the Indian Patent Office, and Indian Complete Patent Application No. 202241006882 filed on Jan. 9, 2023, in the Indian Patent Office, the disclosures of each of which are incorporated by reference herein in their entireties.

BACKGROUND

1. Field

The disclosure generally relates to telecommunication networks. More particularly, the disclosure relates to a method, a mission critical (MC) server, and a receiver for managing media communication in an MC system.

2. Description of Related Art

Mission critical (MC) system, also referred as mission critical video (MCVideo) systems are used for critical applications such as, public safety applications, commercial applications (e.g., utility companies and railways), and the like. The MC system supports group call i.e., communication between several users, private calls, and the like, where each user can send and receive media.

Figure 1A:
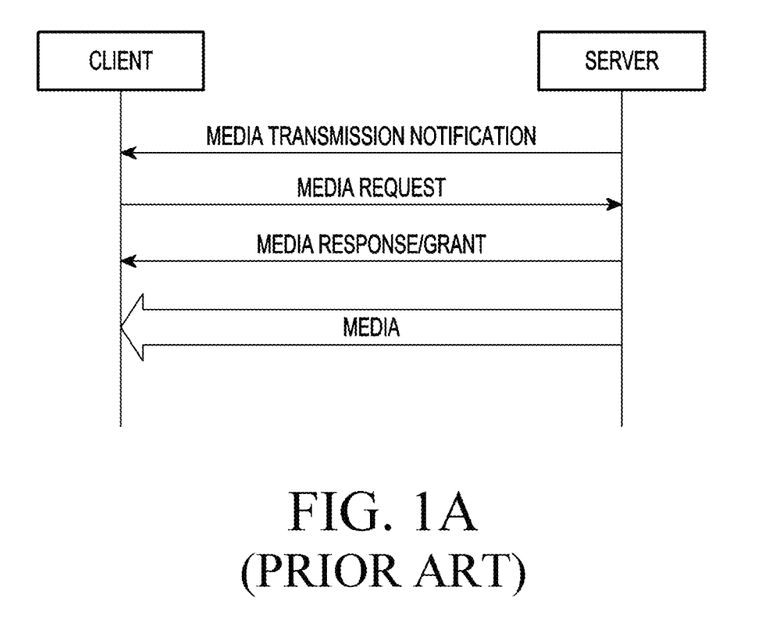
FIGS. 1A and 1B illustrate a conventional MC system.

FIG. 1A illustrates a conventional MC system. In the MC systems, when a user desires to send media, an MC server transmits a media transmission notification to other users (referred as receivers or clients). The receivers can accept, reject, or ignore the media transmission notification, based on user interest, priority, and the like. When a receiver accepts the media transmission notification, a media request is transmitted to the MC server. Then, when the MC server grants the media request, the MC server transmits a media response and further transmits the media.

Figure 1B:
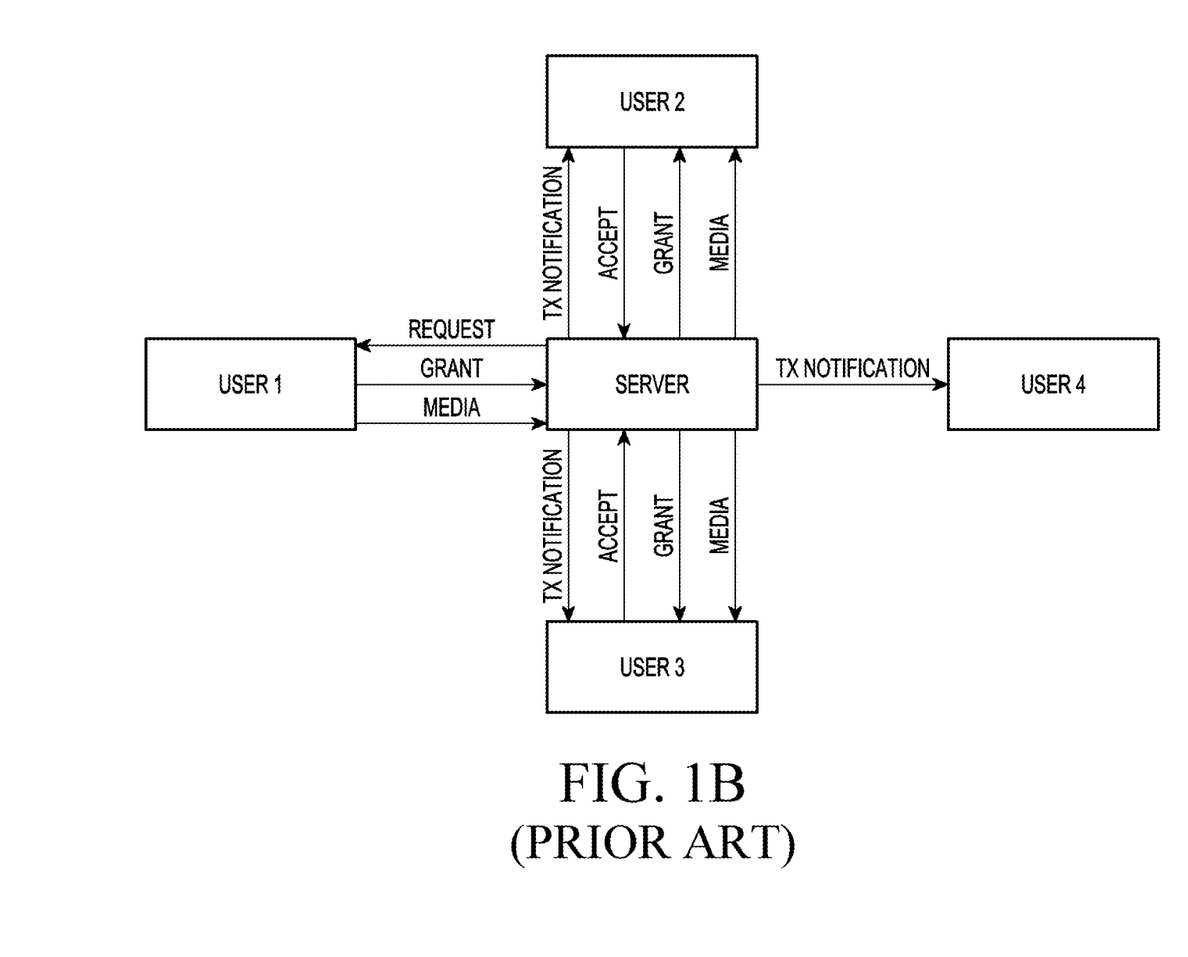

FIG. 1B shows an example of media transmission in the conventional MC system. As shown, the MC system comprises four users. User 1 may desire to transmit the media to other users. The MC server may transmit the media transmission notification to the other users. As shown, the user 2 and user 3 accept the media transmission notification and the media is transmitted to the user 2 and user 3. However, the user 4 may not accept the media transmission notification and the media is not transmitted to the user 4. Hence, in the conventional MC system, the media is transmitted only after the receiver transmits the media request to the MC server and the MC server grants the media request. However, in critical scenarios, such as for any emergency/priority calls, the conventional procedure is not suitable since such procedures wait for the receivers to accept the media transmission notification and is thus time consuming. Hence, in such scenarios, receivers may miss important initial communication until the receivers accept the media transmission notification, which is very critical as waiting might cause damage to life saving efforts.

The information disclosed in this background of the disclosure section is only for enhancement of understanding of the general background of the this disclosure and should not be taken as an acknowledgement or any form of suggestion that this information forms the prior art already known to a person skilled in the art.

SUMMARY

In an embodiment, the disclosure discloses a method of managing media communication in a mission critical (MC) system. The method comprises receiving a request and a media stream, from a sender for transmitting the media stream to one or more receivers. The request indicates a mode of transmission of the media stream. Further, the method comprises transmitting a notification message indicating a mode of reception identified based on the mode of transmission, to the one or more receivers for receiving the media stream from the sender. The mode of reception is one from among an emergency mode and a normal mode. Thereafter, the method comprises transmitting the media stream to the one or more receivers subsequent to transmission of the notification message, when the mode of reception is the emergency mode.

In an embodiment, the disclosure discloses a method of managing media communication in a mission critical (MC) system. The method comprises receiving a notification message from an MC server, for receiving a media stream from a sender. The notification message indicates the mode of reception to be one from among an emergency mode and a normal mode. Further, the method comprises receiving the media stream subsequent to receiving the notification message, when the mode of reception is the emergency mode.

In an embodiment, the disclosure discloses a mission critical (MC) server for managing media communication in a MC system. The MC server comprises one or more processors and a memory. The one or more processors are configured to receive a request and a media stream, from a sender for transmitting the media stream to one or more receivers. The request indicates a mode of transmission of the media stream. Further, the one or more processors are configured to transmit a notification message indicating a mode of reception identified based on the mode of transmission, to the one or more receivers for receiving the media stream from the sender. The mode of reception is one from among an emergency mode and a normal mode. Thereafter, the one or more processors are configured to transmit the media stream to the one or more receivers subsequent to transmission of the notification message, when the mode of reception is the emergency mode.

In an embodiment, the disclosure discloses a receiver for managing media communication in a MC system. The receiver comprises one or more processors and a memory. The one or more processors are configured to receive a notification message from an MC server, for receiving a media stream from a sender. The notification message indicates the mode of reception is one from among an emergency mode and a normal mode. Further, the one or more processors are configured to receive the media stream subsequent to receiving the notification message, when the mode of reception is the emergency mode.

The foregoing summary is illustrative only and is not intended to be in any way limiting. In addition to the illustrative aspects, embodiments, and features described above, further aspects, embodiments, and features will become apparent by reference to the drawings and the following detailed description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying FIGS. One or more embodiments are now described, by way of example only, with reference to the accompanying FIGS. wherein like reference numerals represent like elements and in which:

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

FIGS. 1A through 8, discussed below, and the various embodiments used to describe the principles of the disclosure in this patent document are by way of illustration only and should not be construed in any way to limit the scope of the disclosure. Those skilled in the art will understand that the principles of the disclosure may be implemented in any suitably arranged system or device.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, a specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Mission critical (MC) system are used for critical applications such as, public safety applications, commercial applications, and the like. In a conventional MC system, the media is transmitted from a sender to a receiver only after the receiver accepts a media transmission notification transmitted by the MC system. However, in critical scenarios, such as for any emergency/priority calls, conventional procedures take more time, based on waiting for when the receiver accepts the media transmission notification. Hence, the receivers in the conventional MC system miss important initial communication.

The disclosure provides a method, an MC server, and a receiver for managing media communication in the MC system. In the disclosure, the MC server identifies a mode of reception as an emergency mode or a normal mode, based on a request transmitted from a sender. Further, the MC server transmits a notification message indicating identified the mode of reception to receivers. In response to transmitting the notification message indicating the emergency mode as the mode of reception, the MC server subsequently transmits the media. Hence, the disclosure discloses a method in which the MC server does not wait for the receivers to accept the notification message and transmits the media immediately after transmitting the notification message, when the mode of reception is the emergency mode. Hence, eliminating the chance of missing important media by users in critical scenarios.

Figure 2A:
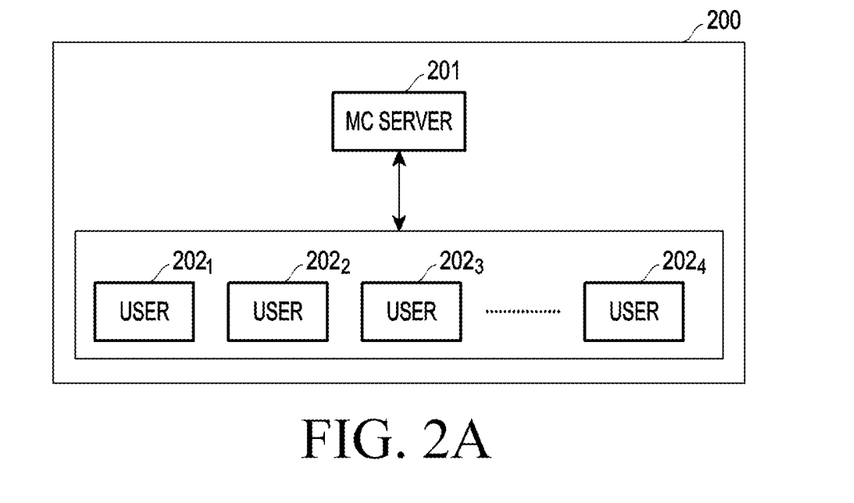
FIGS. 2A and 2B each illustrate an MC system for managing the media communication in the MC system, in accordance with some embodiments of the disclosure.
Figure 2B:
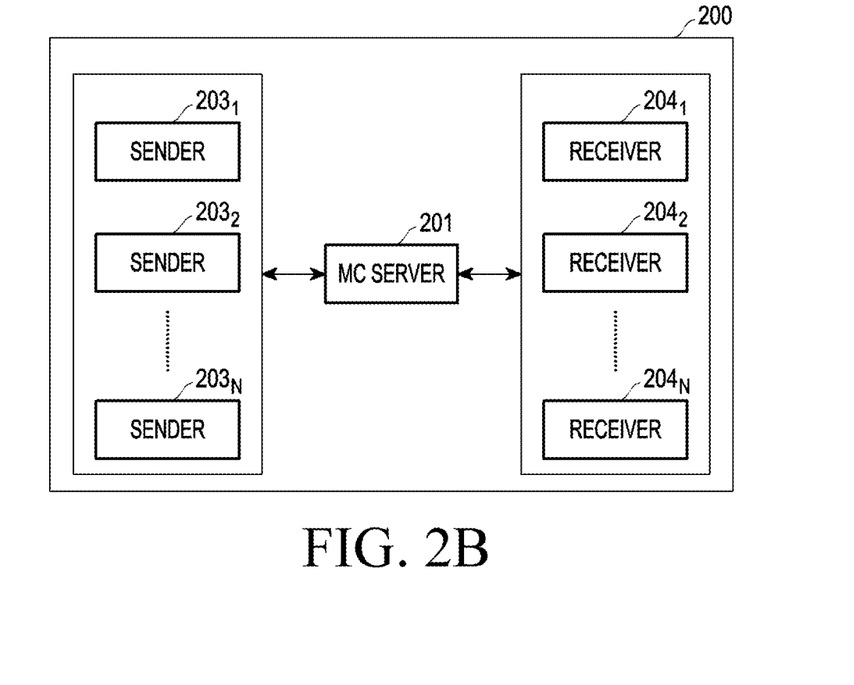

FIG. 2A illustrates an exemplary mission critical (MC) system for managing media communication, in accordance with the embodiments of the disclosure. The exemplary MC system 200 comprises an MC server 201 and a user device 2021, 2022, . . . , 202N (collectively referred as a user 202 or users 202). The MC server 201 manages the media communication between the users 202. The users 202 transmit/receive the media from/to other users, via the MC server 201. A user transmitting the media to other users over the MC system 200 is referred as a sender. A user receiving the media from other users over the MC system 200 is referred as a receiver. Each of the users 202 may be a sender or a receiver as illustrated in FIG. 2B. A sender device 2031, 2032, . . . , 203N (collectively referred as a sender 203 or one or more senders 203) may communicate with a receiver device 2041, 2042, . . . , 204N (collectively referred as a receiver 204 or one or more receivers 204), via the MC server 201. The one or more senders 203, the one or more receivers 204, and the MC server 201 may be any computing device such as, a laptop computer, a desktop computer, a handheld device, a personal computer (PC), a notebook, a smartphone, a tablet, e-book readers, a server, and the like.

The MC server 201 is configured to receive a request and a media stream, from a sender 203, for transmitting the media stream to one or more receivers 204. The request may indicate a mode of transmission of the media stream. Then, the MC server 201 may transmit a notification message indicating a mode of reception to the one or more receivers 204 for receiving the media stream from the sender 203. The mode of reception may be one from among an emergency mode and a normal mode. The mode of reception is identified from the mode of transmission. The MC server 201 may transmit the media stream to the one or more receivers 204 subsequent to transmission of the notification message, when the mode of reception is the emergency mode.

Figure 3:
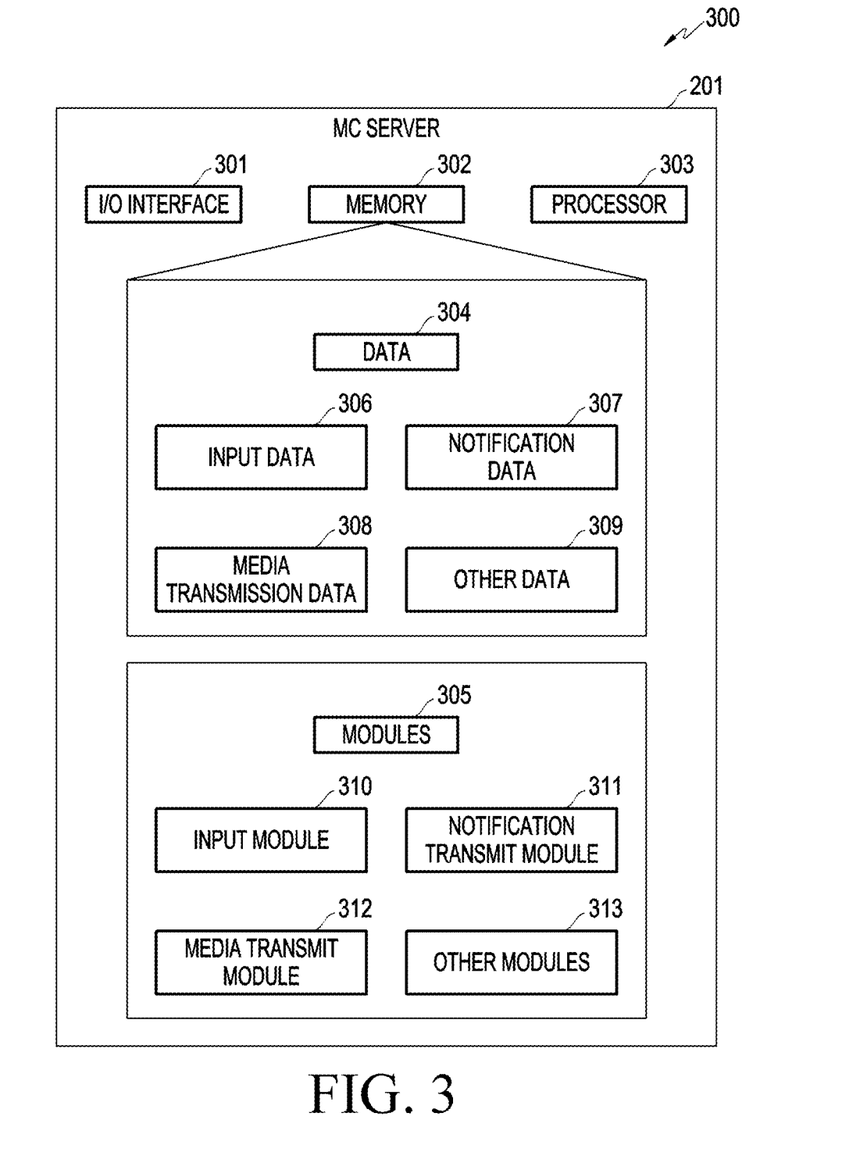
FIG. 3 illustrates a detailed diagram of an MC server for managing the media communication in the MC system, in accordance with some embodiments of the disclosure.

FIG. 3 illustrates a detailed diagram 300 of the MC server 201 for providing the communication services in the wireless communication network, in accordance with some embodiments of the disclosure. The MC server 201 may include central processing units 303 (also referred as "CPUs" or "one or more processors 303"), input/output (I/O) interface 301, and a memory 302. In some embodiments, the memory 302 may be communicatively coupled to the one or more processors 303. The memory 302 stores instructions executable by the one or more processors 303. The one or more processors 303 may comprise at least one data processor for executing program components for executing user or system-generated requests. The memory 302 may be communicatively coupled to the one or more processors 303. The memory 302 stores instructions, executable by the one or more processors 303, which, on execution, may cause the one or more processors 303 to manage the media communication in the MC system 200. In an embodiment, the memory 302 may include one or more modules 305 and data 304. The one or more modules 305 may be configured to perform the steps of the disclosure using the data 304, to manage the media communication in the MC system 200. In an embodiment, each of the one or more modules 305 may be a hardware unit which may be outside the memory 302 and coupled with the MC server 201. As used herein, the term modules 305 refers to an application specific integrated circuit (ASIC), an electronic circuit, a field-programmable gate arrays (FPGA), programmable system-on-chip (PSoC), a combinational logic circuit, and/or other suitable components that provide described functionality. The one or more modules 305 when configured with the described functionality defined in the disclosure will result in a novel hardware.

Further, the I/O interface 301 is coupled with the one or more processors 303 through which an input signal or/and an output signal is communicated. For example, the MC server 201 may receive the request and the media from the sender 203, using the I/O interface 301. Further, the MC server 201 may transmit the notification message and the media to the one or more receivers 204, using the I/O interface 301.

In one implementation, the modules 305 may include, for example, an input module 310, a notification transmit module 311, a media transmit module 312, and other modules 313. It will be appreciated that such aforementioned modules 305 may be represented as a single module or a combination of different modules. In one implementation, the data 304 may include, for example, input data 306, notification data 307, media transmission data 308, and other data 309.

Figure 5A:
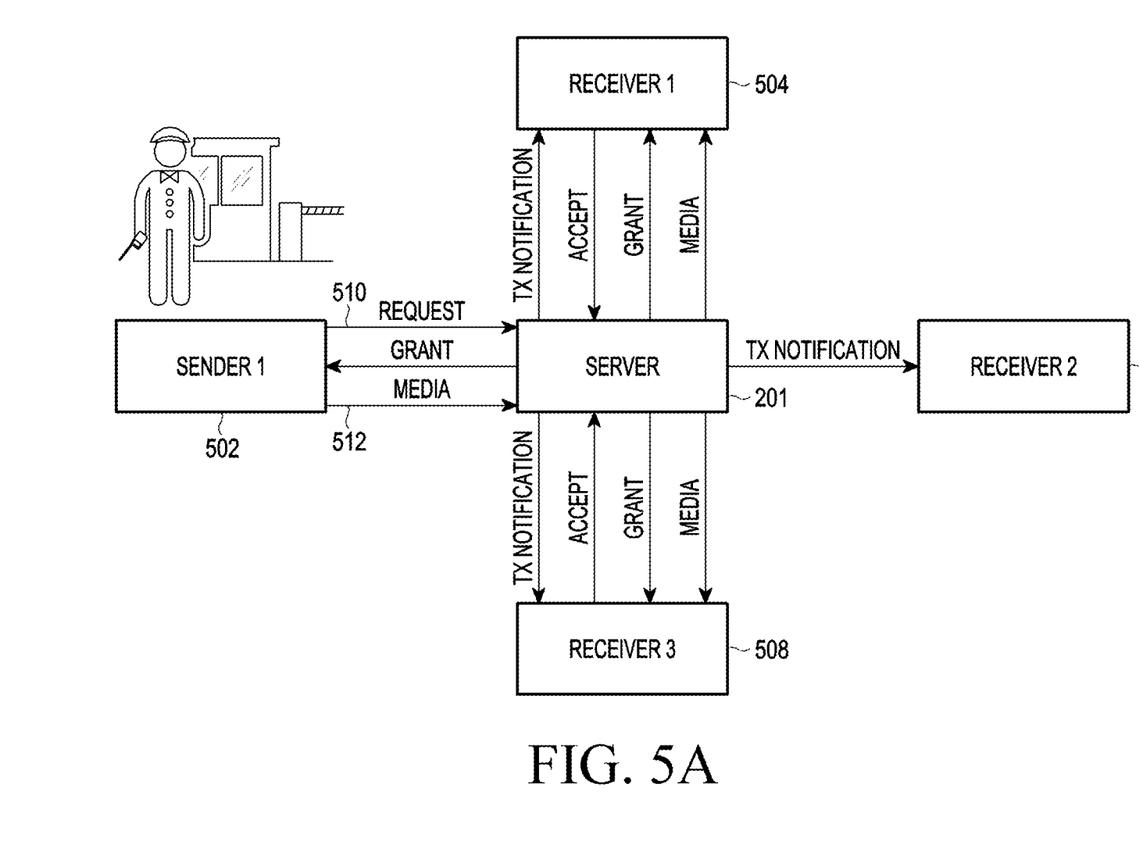
FIG. 5A illustrates example communications for managing the media communication in the MC system when the reception mode is a normal mode, in accordance with some embodiments of the disclosure.
Figure 5B:
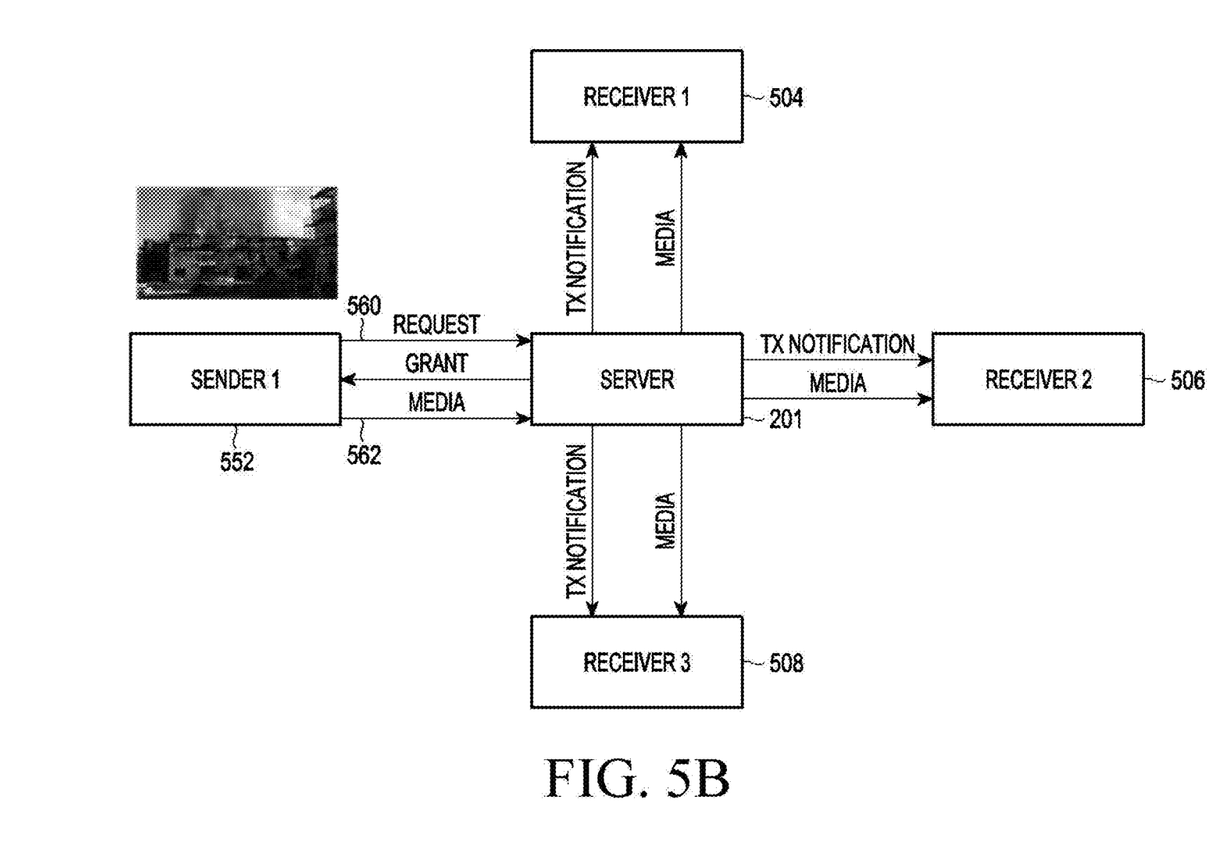
FIG. 5B illustrate example communications for managing the media communication in the MC system when the reception mode is an emergency mode, in accordance with some embodiments of the disclosure.
Figure 6A:
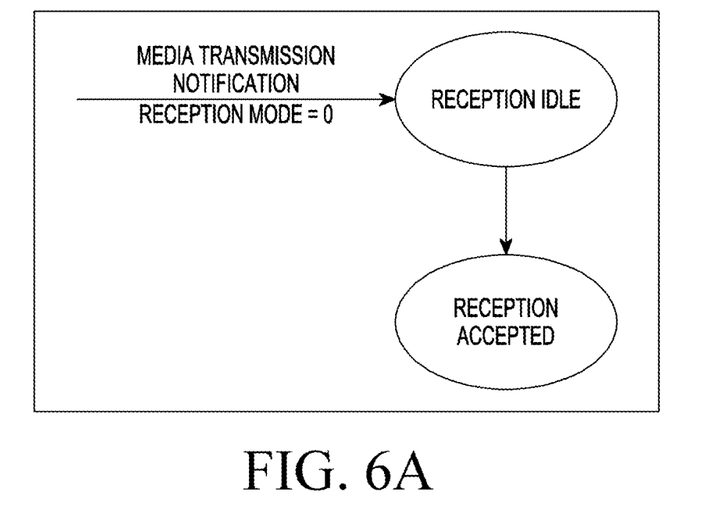
FIGS. 6A-6B illustrate example state diagrams for managing the media communication in the MC system, in accordance with some embodiments of the disclosure.
Figure 6B:
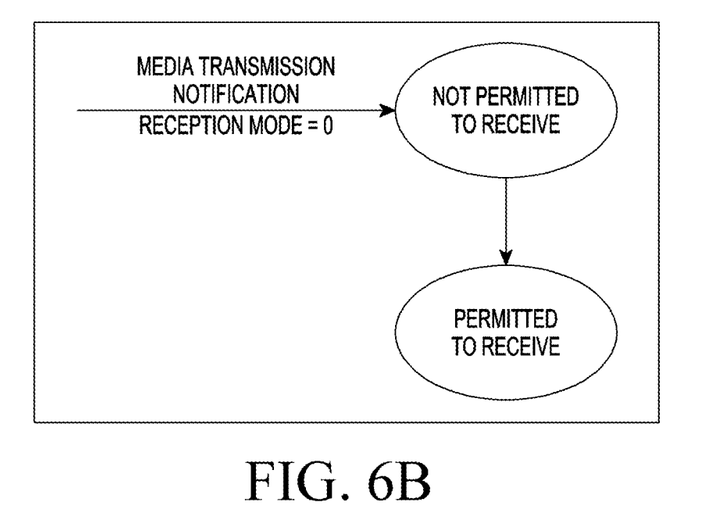

In an embodiment, the input module 310 may be configured to receive the request and the media stream from the sender 203, for requesting the MC server 201 to perform transmitting the media stream to the one or more receivers 204. The sender 203 may desire to transmit the media stream to the one or more receivers 204. In an example, the media stream may include audio data, in case of a voice call from the sender 203. In another example, the media stream may include video and audio data, in case of a video call from the sender 203. The input module 310 may receive the request along with the media stream from the sender 203. In an embodiment, the request may indicate a mode of transmission of the media stream. For instance, the mode of transmission may indicate a normal call, a broadcast group call, an emergency call, an imminent peril group call, a system call, and the like. Referring to a first example illustrated in FIG. 5A, the MC system 200 may comprise a sender device 502, a first receiver device 504, a second receiver device 506, and a third receiver device 508. The sender may be in a normal site, for instance, the sender associated with the sender device 502 may be a policeman outside a public building. For simplicity, the sender device 502 is simply referred to as sender 502. The input module 310 of the server 201 may receive the request 510 and the media 512 from the sender 502. The mode of transmission may be the normal group call. In a second example illustrated in FIG. the sender may be in a critical site, for instance, the sender associated with the sender device 552 may be a person in a fire site. The input module 310 of the server 201 may receive the request 560 and the media stream 562 from the sender 552. The mode of transmission may be the emergency group call. The request 560 and the media stream 562 may be stored as the input data 306 in the memory 302.

Figure 4:
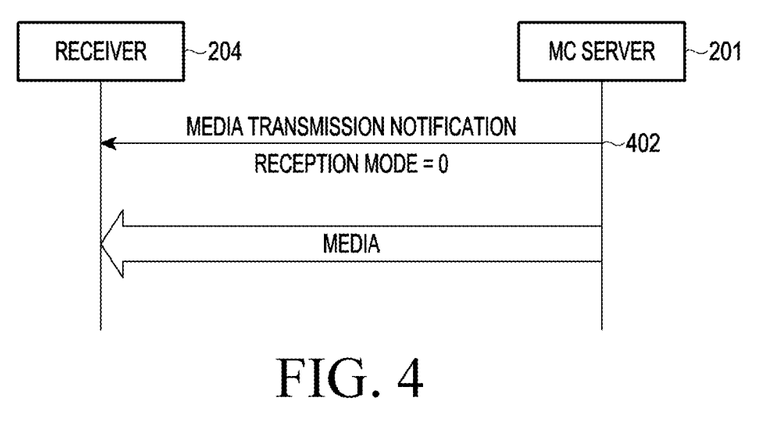
FIG. 4 illustrates communications in the MC system including a notification message indicating a reception mode that is an emergency mode, in accordance with some embodiments of the disclosure.

Referring back to FIG. 3, in an embodiment, the notification transmit module 311 may be configured to receive the input data 306 from the input module 310. Further, the notification transmit module 311 may transmit a notification message to the one or more receivers 204. Firstly, the notification transmit module 311 may identify a mode of reception from the mode of transmission indicated in the request from the sender 203. For instance, the notification transmit module 311 may identify the mode of reception as a normal mode, when the mode of transmission is a normal call. Similarly, the notification transmit module 311 may identify the mode of reception (also referred as Reception mode) as an emergency mode when the mode of transmission is a broadcast group call, an emergency call, an imminent peril group call, or a system call. Further, the notification transmit module 311 may transmit the notification message (also referred as "Media transmission notification" message) to the one or more receivers 204 for receiving the media stream from the sender 203. In an embodiment, the notification message may comprise a reception mode field. The reception mode field may be set to a value '0', when the mode of reception is the emergency mode. For instance, the notification transmit module 311 may transmit the "Media transmission notification" message with Reception mode=0 [Automatic Reception Enabled], when the mode of reception is the emergency mode. The reception mode field may be set to a value '1', when the mode of reception is the normal mode [Automatic Reception Disabled]. Referring to FIG. 4, the notification transmit module 311 may transmit the notification message 402 (also referred as a media transmission notification or a transmission notification) to the one or more receivers 204 with the reception mode field set to the value '0', indicating emergency mode to, as illustrated in FIG. 5B. In another example, the reception mode field may be set to a value '1' that indicates normal mode and sent to one or more receivers 204, as illustrated in FIG. 5A. The MC server 201 may transit the notification message 402 to the first, second, and third receivers (e.g., 2041 . . . 204N of FIG. 2B or 502-508 of FIGS. 5A-5B). The notification message may be stored as the notification data 307 in the memory 302.

Referring back to FIG. 3, in an embodiment, the media transmit module 312 may receive the notification data 307 from the notification transmit module 311. Further, the media transmit module 312 may transmit the media stream to the one or more receivers 204 subsequent to transmission of the notification message, when the mode of reception is the emergency mode. When the mode of reception is emergency mode, the media transmit module 312 may not wait for an acknowledgement from the one or more receivers 204 and may transmit the media immediately. The media transmit module 312 may wait for an acknowledgement from the one or more receivers 204 for the notification message, for reception of the media stream, when the mode of reception is the normal mode. The emergency mode is also referred as "Automatic mode" and the normal mode is also referred as "Manual mode". Further, the media transmit module 312 may transmit the media stream to the one or more receivers 204, upon receiving the acknowledgment from respective receiver 204. The media transmit module 312 may transmit the media to the one or more receivers 204. Referring to the first example illustrated in FIG. 5A, the media transmit module 312 may transmit the media to the first receiver and the third receiver. Further, the media transmit module 312 may wait for the acknowledgment (illustrated as "ACCEPT") from the second receiver and may transmit the media upon receiving the acknowledgement from the second receiver. Referring to the second example illustrated in FIG. 5B, the media transmit module 312 may transmit the media to the first receiver, the second receiver, and the third receiver.

In an embodiment, the media transmit module 312 may configure a control state machine (also referred as "general reception control operation" and "basic reception control operation" state machine) for transmitting the media stream to the one or more receivers 204, when the mode of reception is the emergency mode. The configuring of the control state machine may include enabling a state transition from a "Reception idle" state to a "Reception accepted" state after sending the "Media Transmission Notification" message with Reception Mode=0, as illustrated in a state diagram in FIG. 6A. Further, the configuring of the control state machine may include enabling a state transition from "not permitted to receive" state to a "permitted to receive" state after sending the "Media Transmission Notification" message with Reception Mode=0, as illustrated in a state diagram in FIG. 6B.

In an embodiment, the media transmit module 312 may be associated with a first counter and a second counter. The first counter may comprise a value of number of receivers receiving the media stream from the sender 203. The second counter may comprise a value of number of receivers receiving one or more media streams from one or more senders 203. In an embodiment, the first counter may be C11 counter. The first counter may be set to a total number of the receivers of the media stream, when the mode of reception is the emergency mode. In an embodiment, the first counter may be C17 counter. The second counter may set to a total number of the receivers, of the one or more media streams, when the mode of reception is the emergency mode. For instance, there may be five receivers (2041 . . . 2045) and two senders (2031 and 2032). Two receivers (2041 and 2042) among the five receivers may receive the media from a first sender (2031). Other three receivers (2043 . . . 2045) may receive the media from a second sender (2032). In such case, the first counter may be set as two and three for the first sender and the second sender, respectively. The second counter may be set as five.

The other data 309 may store data, including temporary data and temporary files, generated by the one or more modules 305 for performing the various functions of the MC server 201. The one or more modules 305 may also include the other modules 313 to perform various miscellaneous functionalities of the MC server 201. The other data 309 may be stored in the memory 302. It will be appreciated that the one or more modules 305 may be represented as a single module or a combination of different modules.

Figure 7:
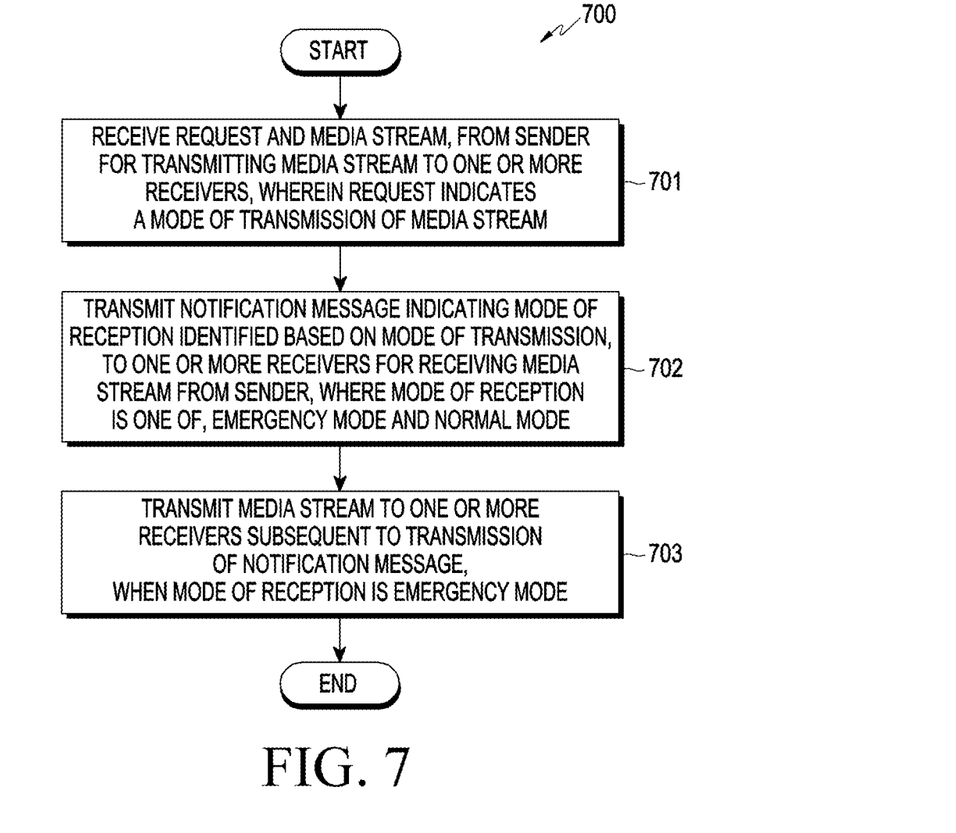
FIG. 7 illustrates a method for managing the media communication in the MC system, in accordance with some embodiments of the disclosure.

FIG. 7 illustrates a method for managing media communication in the MC system 200, in accordance with some embodiments of the disclosure. As illustrated in FIG. 7, the method 700 may comprise one or more steps. The method 700 may be described in the general context of computer executable instructions. Generally, computer executable instructions can include routines, programs, objects, components, data structures, procedures, modules, and functions, which perform particular functions or implement particular abstract data types.

The order in which the method 700 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 701, the MC server 201 receives the request and the media stream from the sender 203, for transmitting the media stream to the one or more receivers 204. In an embodiment, the request may indicate a mode of transmission of the media stream. For instance, the mode of transmission may indicate a normal call, a broadcast group call, an emergency call, an imminent peril group call, a system call, and the like.

At step 702, the MC server 201 transmits the notification message to the one or more receivers 204. The MC server 201 may identify a mode of reception from the mode of transmission indicated in the request from the sender 203. Further, the MC server 201 may transmit the notification message to the one or more receivers 204 for receiving the media stream from the sender 203. In an embodiment, the notification message may comprise a reception mode field. The reception mode field may be set to a value '0', when the mode of reception is the emergency mode, which is selected for a broadcast group call, an emergency call, an imminent peril group call, and a system call. The reception mode field may be set to a value '1', when the mode of reception is the normal mode which is selected for a normal group call. In an embodiment, the one or more receivers 204 may notify the reception of the media stream to a user associated with the receiver 204, upon receiving the notification message indicating the emergency mode. Further, the one or more receivers 204 may store identity information of the sender 203. In an embodiment, the identity information may comprise User Identity (ID) of the sender 203 and Synchronization Source (SSRC) assigned to the sender 203. The SSRC indicates a source of the media stream. Further, the one or more receivers 204 may creating and configuring a reception state machine (also referred as "basic reception operation" state machine) for receiving the media stream from the sender 203. The configuration of the reception state machine may include entering to a "has permission to receive" state.

At step 703, the MC server 201 transmits the media stream to the one or more receivers 204 subsequent to transmission of the notification message, when the mode of reception is the emergency mode. When the mode of reception is emergency mode, the MC server 201 may not wait to receive an acknowledgement from the one or more receivers 204 and may transmit the media immediately after transmission of the notification message that indicates the mode of reception is the emergency mode. The MC server 201 may wait for an acknowledgement from the one or more receivers 204 for the notification message, for reception of the media stream, when the mode of reception is the normal mode. Further, the MC server 201 may transmit the media stream to the one or more receivers 204, in response to receiving the acknowledgment from respective receiver 204.

Figure 8:
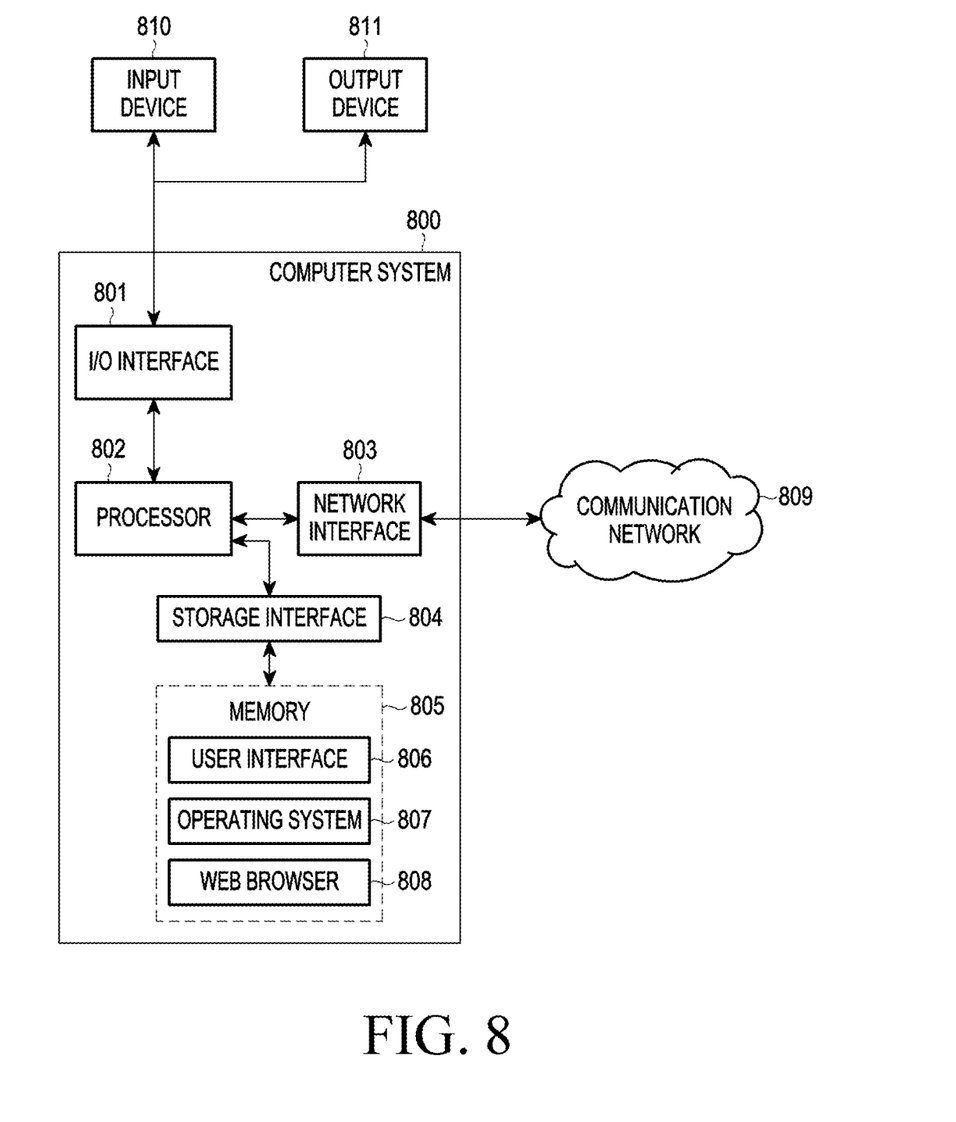
FIG. 8 illustrates a block diagram of a computing system for managing the media communication in the MC system, in accordance with embodiments of the disclosure.

FIG. 8 illustrates a block diagram of an exemplary computer system 800 for implementing embodiments consistent with the disclosure. In an embodiment, the computer system 800 may be implemented in the MC server 201, the sender 203, or the one or more receivers 204. Thus, the computer system 800 may be used to manage the communication media in the MC system 200. When the computer system 800 is implemented in the MC server 201, the computer system 800 may communicate with the sender 203 for receiving the request and the over a communication network 809. Further, the computer system 800 may communicate with the one or more receivers 204 to transmit the notification message and the media stream over the communication network 809. Similarly, when the computer system 800 is implemented in the sender 203, the computer system 800 may communicate with the MC server 201 over the communication network 809. When the computer system 800 is implemented in the one or more receivers 204, the computer system 800 may communicate with the MC server 201 over the communication network 809. The computer system 800 may comprise a central processing unit 802 (also referred as "CPU" or "processor"). The processor 802 may comprise at least one data processor. The processor 802 may include specialized processing units such as integrated system (bus) controllers, memory management control units, floating point units, graphics processing units, digital signal processing units, etc.

The processor 802 may be disposed in communication with one or more input/output (I/O) devices (not shown) via I/O interface 801. The I/O interface 801 may employ communication protocols/methods such as, without limitation, audio, analog, digital, monoaural, RCA, stereo, IEEE (institute of electrical and electronics engineers)-1394, serial bus, universal serial bus (USB), infrared, PS/2, BNC, coaxial, component, composite, digital visual interface (DVI), high-definition multimedia interface (HDMI), radio frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 801, the computer system 800 may communicate with one or more I/O devices. For example, the input device 810 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 811 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 802 may be disposed in communication with the communication network 809 via a network interface 803. The network interface 803 may communicate with the communication network 809. The network interface 803 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 809 may include, without limitation, a direct interconnection, local area network (LAN), wide area network (WAN), wireless network (e.g., using wireless application protocol), the Internet, etc. The network interface 803 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 809 includes, but is not limited to, a direct interconnection, an e-commerce network, a peer to peer (P2P) network, local area network (LAN), wide area network (WAN), wireless network (e.g., using wireless application protocol), the Internet, Wi-Fi, and such. The first network and the second network may either be a dedicated network or a shared network, which represents an association of the different types of networks that use a variety of protocols, for example, hypertext transfer protocol (HTTP), transmission control protocol/internet protocol (TCP/IP), wireless application protocol (WAP), etc., to communicate with each other. Further, the first network and the second network may include a variety of network devices, including routers, bridges, servers, computing devices, storage devices, etc.

In some embodiments, the processor 802 may be disposed in communication with a memory 805 (e.g., RAM, ROM, etc. not shown in FIG. 8) via a storage interface 804. The storage interface 804 may connect to memory 805 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 805 may store a collection of program or database components, including, without limitation, user interface 806, an operating system 807, web browser 808 etc. In some embodiments, computer system 800 may store user/application data, such as, the data, variables, records, etc., as described in this disclosure. Such databases may be implemented as fault-tolerant, relational, scalable, secure databases such as Oracle® or Sybase®.

The operating system 807 may facilitate resource management and operation of the computer system 800. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like.

In some embodiments, the computer system 800 may implement the web browser 808 stored program component. The web browser 808 may be a hypertext viewing application, for example MICROSOFTR INTERNET EXPLORER™, GOOGLER CHROMETMO, MOZILLAR FIREFOX™, APPLER SAFARI™, etc. Secure web browsing may be provided using secure hypertext transport protocol (HTTPS), secure sockets layer (SSL), transport layer security (TLS), etc. Web browsers 808 may utilize facilities such as AJAX™, DHTML™, ADOBER FLASH™, JAVASCRIPT™, JAVA™, application programming interfaces (APIs), etc. In some embodiments, the computer system 800 may implement a mail server (not shown in FIG. 8) stored program component. The mail server may be an Internet mail server such as Microsoft Exchange, or the like. The mail server may utilize facilities such as ASP™, ACTIVEX™, ANSI™ C++/C #, MICROSOFTR, .NET™, CGI SCRIPTS™, JAVA™, JAVASCRIPT™, PERL™, PHP™, PYTHON™, WEBOBJECTS™, etc. The mail server may utilize communication protocols such as internet message access protocol (IMAP), messaging application programming interface (MAPI), MICROSOFTR exchange, post office protocol (POP), simple mail transfer protocol (SMTP), or the like. In some embodiments, the computer system 800 may implement a mail client stored program component. The mail client (not shown in FIG. 8) may be a mail viewing application, such as APPLER MAIL™, MICROSOFTR ENTOURAGE™, MICROSOFTR OUTLOOK™, MOZILLAR THUNDERBIRD™, etc.

Furthermore, one or more computer-readable storage media may be utilized in implementing embodiments consistent with the disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, compact disc read-only memory (CD ROMs), digital video disc (DVDs), flash drives, disks, and any other known physical storage media.

The disclosure discloses a method in which the MC server does not wait for the receivers to accept the notification message and transmits the media immediately after transmitting the notification message, when the mode of reception is the emergency mode. Hence, eliminating the chance of missing important media by users in critical scenarios.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the this disclosure need not include the device itself.

The illustrated operations of FIG. 5 shows certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

Although the disclosure has been described with various embodiments, various changes and modifications may be suggested to one skilled in the art. It is intended that the disclosure encompass such changes and modifications as fall within the scope of the appended claims.

What is claimed is:

1. A method of managing media communication in a mission critical (MC) system, the method comprising:
   receiving, by an MC server from a sender, a request for transmitting the media stream to one or more receivers and a media stream, wherein the request indicates a mode of transmission of the media stream;
   transmitting, by the MC server to the one or more receivers, a notification message indicating a mode of reception identified based on the mode of transmission for receiving the media stream from the sender, wherein the mode of reception is one from among an emergency mode and a normal mode; and
   transmitting, by the MC server, the media stream to the one or more receivers subsequent to transmission of the notification message, when the mode of reception is the emergency mode.

2. The method of claim 1, wherein:
   the notification message comprises a reception mode field;
   the reception mode field is set to a value '0' when the mode of reception is the emergency mode; and
   the reception mode field is set to a value of "1" when the mode of reception is the normal mode.

3. The method of claim 1, wherein when the mode of reception is the normal mode, transmitting the media stream to the one or more receivers further comprises:
   waiting to receive an acknowledgement from the one or more receivers for the notification message; and
   in response to receiving the acknowledgment from each respective receiver among the one or more receivers, transmitting the media stream to the respective receiver.

4. The method of claim 1, further comprising:
   configuring a first counter comprising a value of number of receivers receiving the media stream from the sender; and
   configuring a second counter comprising a value of number of receivers receiving one or more media streams from one or more senders,
   wherein the first counter is set to a total number of the receivers of the media stream from the sender, and
   wherein the second counter is set to a total number of the receivers of the one or more media streams, subsequent to transmission of the notification message indicating the mode of reception is the emergency mode.

5. The method of claim 4, wherein the first counter is a C11 counter, and the second counter is a C7 counter.

6. The method of claim 1, wherein transmitting the media stream to the one or more receivers subsequent to transmission of the notification message when the mode of reception is the emergency mode comprises:
   configuring a control state machine to a "reception accepted" state and a "permitted to receive" state; and
   in response to the configuration of the control state machine, transmitting the media stream to the one or more receivers.

7. A method of managing media communication in a mission critical (MC) system, the method comprising:
   receiving, by a receiver from among one or more receivers, a notification message from an MC server for receiving a media stream from a sender, wherein the notification message indicates a mode of reception that is one from among an emergency mode and a normal mode; and
   receiving, by the receiver from the MC server, the media stream subsequent to receiving the notification message, when the mode of reception is the emergency mode.

8. The method of claim 7, wherein:
   the notification message comprises a reception mode field;
   the reception mode field is set to a value '0' when the mode of reception is the emergency mode; and
   the reception mode field is set to a value of "1" when the mode of reception is the normal mode.

9. The method of claim 7, wherein receiving the notification message from the MC server further comprises:
   notifying the reception of the media stream to a user associated with the receiver;
   storing identity information of the sender;
   creating a reception state machine; and
   configuring the reception state machine to a "has permission to receive" state for receiving the media stream from the sender.

10. The method of claim 7, further comprising in response to receiving the notification message indicating the mode of reception is the normal mode, transmitting an acknowledgement to the MC server for the notification message.

11. A mission critical (MC) server for managing media communication in a MC system, the MC server comprising:
    one or more processors; and
    a memory configured to store processor-executable instructions, that when executed, cause the one or more processors to:
       receive a request and a media stream from a sender, the request for transmitting the media stream to one or more receivers, wherein the request indicates a mode of transmission of the media stream;
       transmit a notification message indicating a mode of reception identified based on the mode of transmission to the one or more receivers for receiving the media stream from the sender, wherein the mode of reception is one from among an emergency mode and a normal mode; and
       transmit the media stream to the one or more receivers subsequent to transmission of the notification message, when the mode of reception is the emergency mode.

12. The MC server of claim 11, wherein:
the notification message comprises a reception mode field;
the reception mode field is set to a value '0' when the mode of reception is the emergency mode; and
the reception mode field is set to a value of "1" when the mode of reception is the normal mode.

13. The MC server of claim 11, wherein the one or more processors are further configured to:
when the mode of reception is the normal mode, transmit the media stream to the one or more receivers by:
waiting to receive an acknowledgement from the one or more receivers for the notification message; and
in response to receiving the acknowledgment from each respective receiver among the one or more receivers, transmitting the media stream to the respective receiver.

14. The MC server of claim 11, wherein the one or more processors are further configured to:
configure a first counter comprising a value of number of receivers receiving the media stream from the sender; and
configure a second counter comprising a value of number of receivers receiving one or more media streams from one or more senders,
wherein the first counter is set to a total number of the receivers of the media stream from the sender, and
wherein the second counter is set to a total number of the receivers of the one or more media streams, subsequent to transmission of the notification message indicating the mode of reception is the emergency mode.

15. The MC server of claim 14, wherein the first counter is a C11 counter, and the second counter a is C7 counter.

16. The MC server of claim 11, wherein the one or more processors are configured to transmit the media stream to the one or more receivers subsequent to transmission of the notification message when the mode of reception is the emergency mode by:
configuring a control state machine to a "reception accepted" state and a "permitted to receive" state; and
in response to the configuration of the control state machine, transmitting the media stream to the one or more receivers.

17. A receiver for managing media communication in a mission critical (MC) system, the receiver comprising:
one or more processors; and
a memory configure to store processor-executable instructions, that when executed, cause the one or more processors to:
receive a notification message from an MC server for receiving a media stream from a sender, wherein the notification message indicates a mode of reception that is one from among an emergency mode and a normal mode; and
receive the media stream from the MC server subsequent to receiving the notification message, when the mode of reception is the emergency mode.

18. The receiver of claim 17, wherein:
the notification message comprises a reception mode field;
the reception mode field is set to a value '0' when the mode of reception is the emergency mode; and
the reception mode field is set to a value of "1" when the mode of reception is the normal mode.

19. The receiver of claim 17, wherein to receive the notification message from the MC server, the one or more processors are further configured to:
notify the reception of the media stream to a user associated with the receiver;
store identity information of the sender;
create a reception state machine; and
configure the reception state machine to a "has permission to receive" state for receiving the media stream from the sender.

20. The receiver of claim 17, wherein the one or more processors are further configured to in response to receiving the notification message indicating the mode of reception is the normal mode, transmit an acknowledgement to the MC server for the notification message.

* * * * *